(12) United States Patent
Chen et al.

(10) Patent No.: US 7,412,265 B2
(45) Date of Patent: Aug. 12, 2008

(54) METHOD AND SYSTEM FOR POWER-SAVING IN A WIRELESS LOCAL AREA NETWORK

(75) Inventors: Meng-Hong Chen, Taipei (TW); Juin-Jia Dai, Hsinchu County (TW); Tzu-Ming Lin, Taipei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 823 days.

(21) Appl. No.: 10/654,954

(22) Filed: Sep. 5, 2003

(65) Prior Publication Data

US 2004/0253996 A1 Dec. 16, 2004

Related U.S. Application Data

(60) Provisional application No. 60/477,774, filed on Jun. 12, 2003.

(51) Int. Cl.
*H04B 1/38* (2006.01)
*H04B 1/04* (2006.01)
*H04B 1/16* (2006.01)
*G08C 17/00* (2006.01)
*H04Q 7/24* (2006.01)

(52) U.S. Cl. .................. 455/574; 455/127.5; 455/343.2; 370/311; 370/338

(58) Field of Classification Search ... 340/693.3–693.4, 340/693.1, 539.1, 539.3, 7.32–7.38, 10.33, 340/10.34; 455/343.1–343.6, 127.1, 127.5, 455/571–574, 91, 13.4, 515–517, 95, 528, 455/550.1, 556.2, 560–561; 342/385–386; 713/300, 310, 321–324, 330, 340; 370/311–314, 370/328–329, 338
See application file for complete search history.

(56) References Cited

U.S. PATENT DOCUMENTS

| | | | | |
|---|---|---|---|---|
| 5,560,021 | A | 9/1996 | Vook et al. | 395/750 |
| 5,625,882 | A | 4/1997 | Vook et al. | 455/38.3 |
| 6,002,918 | A | 12/1999 | Heiman et al. | 455/38.3 |
| 6,091,717 | A * | 7/2000 | Honkasalo et al. | 370/329 |
| 6,463,307 | B1 | 10/2002 | Larsson et al. | 455/574 |
| 6,674,738 | B1 * | 1/2004 | Yildiz et al. | 370/338 |
| 2004/0190467 | A1* | 9/2004 | Liu et al. | 370/311 |
| 2005/0174973 | A1* | 8/2005 | Kandala et al. | 370/338 |
| 2006/0165046 | A1* | 7/2006 | Del Prado Pavon | 370/350 |

OTHER PUBLICATIONS

Shiann-Tsong Sheu et. al., *A Bandwidth Allocation/Sharing/Extension Protocol for Multimedia Over IEEE 802.11 Ad Hoc Wireless LANs*, pp. 2065-2080, IEEE Journal On Selected Areas In Communications, vol. 19, No. 10, Oct. 2001.

Hung-Huang Liu et. al., *Packet Telephony Support for the IEEE 802.11 Wireless LAN*, pp. 286-288, IEEE Communications Letters, vol. 4, No. 9, Sep. 2000.

* cited by examiner

*Primary Examiner*—Meless N Zewdu
(74) *Attorney, Agent, or Firm*—Bacon & Thomas, PLLC

(57) ABSTRACT

A method and system for power saving in a wireless LAN is disclosed, which uses the method of modifying the beacon frame body or broadcasting the schedule information frame. The medium access behavior of each station during the contention free period (CFP) and the contention period (CP) can be dynamically re-programmed. Therefore, the stations that should access the radio medium can only wake up at the specific access time to send or receive the packet and re-enters its power-saving state after the data transmission.

14 Claims, 14 Drawing Sheets

METHOD AND SYSTEM FOR POWER-SAVING IN A WIRELESS LOCAL AREA NETWORK

BACKGROUND OF THE INVENTION

1. Field of the Invention

The present invention relates to the technical field of wireless local area network (WLAN) and, more particularly, to a method and system for power saving in a WLAN.

2. Description of Related Art

In the recent years, the IEEE 802.11 wireless local area network (WLAN) has become attractive and popular in the market, due to the benefits of low cost in the network deployment, high bandwidth, and lower technical complexity. The existing Internet applications and service in the application layer can be directly used since the design of IEEE 802.11 WLAN follows the protocol stack of IEEE project-802 standards. For example, the voice over IP (VoIP) service runs in the application layer of user's device to provide the audio service no matter the medium access control (MAC) of data link layer is 802.3 (Ethernet) MAC or 802.11 MAC. For the device that runs VoIP service in the application layer and uses the IEEE 802.11 WLAN as the radio access technology to provide the inexpensive wireless audio service, the requirement of low power consumption in this device becomes a very important issue. The operating time (battery-life per charge) of the user device can be increased if the mechanism of MAC protocol can efficiently save the power.

The IEEE 802.11 WLAN standards had specified the operation of power management. The power-saving mode in the IEEE 802.11 WLAN uses the mechanism of traffic indication map (TIM) to save the power. However, the mechanism of TIM in the IEEE 802.11 standard cannot effectively save the power during the active period.

There are two kinds of the basic network architecture in the IEEE 802.11 WLAN, namely infrastructure WLAN and ad hoc WLAN. In the infrastructure WLAN, there are some access points (APs) in the network. FIG. 1 shows an infrastructure power management operation without point coordination function (PCF). As shown, the AP periodically broadcasts the beacon frame at the start of beacon interval. The power save stations (PS-STAs) that are in sleeping state may periodically wake up to receive the specific beacon frames. Each beacon frame includes the TIM field to indicate those PS-STAs that some packets for the specific PS-STAs are buffered in the AP. The PS-STAs should keep waking up during the remaining beacon interval period to wait for the AP's polling messages during the contention free period (CFP) when that the received traffic indicator bit in the bitmap control sub-field of TIM field is set to 1. In addition, since the broadcast packets or the multicast packets are indicated through the beacon frame with the delivery TIM (DTIM) message, the PS-STAs may wake up at that time to avoid losing the broadcast or multicast packet. FIG. 1 shows that the STA B lost the broadcast frame.

According to the above descriptions, the PS-STAs should keep awake during the remaining beacon interval period to wait for the AP's polling messages whenever they receive its traffic indicator bit in the bitmap control sub-field of TIM field being set to 1. However, this scheme still wastes the energy on unnecessarily monitoring the radio medium, and thus it is not satisfactory in saving the power.

FIG. 2 illustrated the basic power-saving operation in an independent basic service set (IBBS) of an ad hoc WLAN. In an ad hoc WLAN, the PS-STAs periodically wake up at almost the same time and keep awake for a period, namely ad hoc TIM (ATIM) window. In order to synchronize the timing with each other, every PS-STA contends for sending a beacon frame at the start of each beacon interval and the first successful beacon transmission restrains the other STAs from transmitting their beacon frames. Any STA that wants to transmit the data can deliver an ATIM frame to the destination during the ATIM window after the beacon frame. The destination PS-STA must be awake and reply an ACK frame during the ATIM window. After the two-way handshaking, the source PS-STA and the destination PS-STA must keep awake during the remaining beacon interval. The source PS-STA would transmit the data by using the carrier sense multiple access with collision avoidance (CSMA/CA) protocol after the ATIM window (during the remaining beacon interval).

According to the descriptions mentioned above, the source PS-STA and destination PS-STA should keep awake during the remaining beacon interval period to finish the data transmission. However, this scheme still wastes the energy on unnecessarily contending or monitoring the radio medium, and thus it is not satisfactory in efficiently saving power.

U.S. Pat. No. 5,560,021 discloses a power-saving mechanism that is similar to the traditional IEEE 802.11 WLAN. The network establishes a plurality of recurring time intervals, and each time interval has a first portion during which all user devices are in the active mode of operation and a second portion for communication of packet data. The user device having data to transmit should transmit an indicator signal in the first portion. On the other hand, the user device should remain in an active mode of operation if the received indicator signal is addressed for receiving a fragment of a packet of data. However, in the second portion of time interval, the source and destination device need to be in the active mode, which may consume lots of power.

U.S. Pat. No. 5,625,882 discloses an awake counter mechanism to determine whether a user device enters the sleep mode of operation or not. Before entering the sleep mode, the user device selects a synchronization signal rate of $2^x$, where x is $0<x<8$. The user device in sleep mode transfers from the sleep mode of operation to the active mode of operation in order to monitor the synchronization signal's content. The user device enters the active mode of operation if the synchronization signal indicates the request of packet transmission. In this mechanism, each user device needs to be in the active mode for a period no matter the packet transmission has finished, and thus the power consumption cannot be efficiently reduced. Therefore, there is a need to have a novel design of power-saving in the wireless local area network that can mitigate and/or obviate the aforementioned problems.

SUMMARY OF THE INVENTION

The object of the present invention is to provide an IEEE 802.11 WLAN compatible method and system for power-saving in a wireless local area network which can satisfy the requirement of low power consumption for the IEEE 802.11 WLAN mobile devices in the future market, thereby increasing the competitiveness of the IEEE 802.11 WLAN products.

In accordance with the first aspect of the present invention, there is provided a method for power-saving in a wireless local area network including a point coordinator and plural stations. Each station has an active state and a power-saving state, and is able to transmit and receive data through a radio medium directly to and from the point coordinator. The method comprises: a beacon transmitting step in which the point coordinator periodically transmits a beacon frame with a schedule information which includes plural sets of association identification and time slot information, the association identification indicating that there is duration for a corresponding station to receive/transmit data and the time slot information specifying the time that the corresponding station is in the active state for receiving/transmitting data; a beacon receiving step in which each station periodically enters its active state to receive the beacon frame; a wake-up step in which if there is duration for a specific station to receive/transmit data, the specific station enters its active state to receive/transmit data in the time specified by the time slot information in the beacon frame; and a re-entering sleep mode step in which each specific station re-enters its power-saving state after the data transmission.

In accordance with the second aspect of the present invention, there is provided a method for power-saving in a wireless local area network including a point coordinator and plural stations. Each station has an active state and a power-saving state, and is able to transmit and receive data through a radio medium directly to and from the point coordinator. The method comprises: a beacon transmitting step in which the point coordinator periodically transmits a beacon frame; a schedule information transmitting step in which the point coordinator transmits a schedule information after transmitting the beacon frame, the schedule information including plural sets of association identification and time slot information, the association identification indicating that there is duration for a corresponding station to receive/transmit data and the time slot information specifying the time that the corresponding station is in the active state for receiving/transmitting data; a beacon and schedule information frame receiving step in which each station periodically enters its active state to receive the beacon frame and the schedule information; a wake-up step in which, if there is duration for a specific station to receive/transmit data, the specific station enters its active state to receive/transmit data in the time frame specified by the time slot information in the schedule information frame; and a re-entering sleep mode step in which each specific station re-enters its power-saving state after the data transmission.

In accordance with the third aspect of the present invention, there is provided a method for power-saving in a wireless local area network including a plurality of stations. One station is designated as control station and the remaining stations have an active state and a power-saving state, and are able to transmit and receive data through a radio medium directly to and from each other. The method comprises: an association step in which the remaining stations associate with the control station to obtain their association identifications; a schedule information transmitting step in which the control station transmits a schedule information frame after a beacon frame followed by a predetermined time period, the schedule information including a duration field set to a specific time duration, an Address 1 field set to a particular multicast address, and a frame body having a plurality of sets of association identification and time slot information, the association identification indicating that there is a corresponding remaining station to access the radio media, the time slot information specifying the time that the corresponding remaining station is in active state for accessing the radio media; a beacon and schedule information receiving step in which each remaining station periodically enters its active state to receive the beacon frame and the schedule information frame; a wake-up step in which, if there is an association identification indicates that there is a corresponding remaining station to access the radio media, the remaining station enters its active state to access the radio media in the time specified by the time slot information in the schedule information frame; and a re-entering sleep mode step in which each corresponding remaining station re-enters its power-saving state after the data transmission.

In accordance with the fourth aspect of the present invention, there is provided a system for power-saving in a wireless local area network, which comprises plural stations and a point coordinator. Each station has an active state and a power-saving state, is able to transmit and receive data through a radio medium directly to and from the point coordinator, and periodically enters its active state to receive a beacon frame. The point coordinator periodically transmits the beacon frame with schedule information including plural sets of association identification and time slot information. The association identification indicates that there is duration for a corresponding station to receive/transmit data. The time slot information specifies the time that the corresponding station is in the active state for receiving/transmitting data. If there is duration for a specific station to receive/transmit data, the specific station enters its active state to receive/transmit data in the time specified by the time slot information in the beacon frame and re-enters its power-saving state after the data transmission.

In accordance with the fifth aspect of the present invention, there is provided a system for power-saving in a wireless local area network, which comprises plural stations and a point coordinator. Each station has an active state and a power-saving state, is able to transmit and receive data through a radio medium directly to and from a point coordinator, and periodically enters its active state to receive the beacon frame and the schedule information. The point coordinator periodically transmits the beacon frame and transmits a schedule information after transmitting the beacon frame. The schedule information includes plural sets of association identification and time slot information. The association identification indicates that there is duration for a corresponding station to receive/transmit data. The time slot information specifies the time that the corresponding station is in the active state for receiving/transmitting data. If there is duration for a specific station to receive/transmit data, the specific station enters its active state to receive/transmit data in the time frame specified by the time slot information in the schedule information frame and re-enters its power-saving state after the data transmission.

In accordance with the sixth aspect of the present invention, there is provided a system for power-saving in a wireless local area network, which comprises plural first stations and a second station designated as the control station. The first stations associates with the control station to obtain their association identifications. Each first station has an active state and a power-saving state, is able to transmit and receive data through a radio medium directly to and from each other, and periodically enters its active state to receive a beacon frame and a schedule information frame. The control station transmits the schedule information frame after the beacon frame followed by a predetermined time period. The schedule information includes a duration field set to specific time duration, an Address 1 field set to a particular multicast address, and a frame body having a plurality of sets of association identification and time slot information. The association identification indicates that there is a corresponding first station to access the radio media. The time slot information specifies the time that the corresponding first station is in active state for accessing the radio media. If there is an association identification indicates that there is a corresponding first station to access the radio media, the first station enters its active state to access the radio media in the time specified by the time slot information in the schedule information frame and re-enters the power-saving state after the data transmission.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
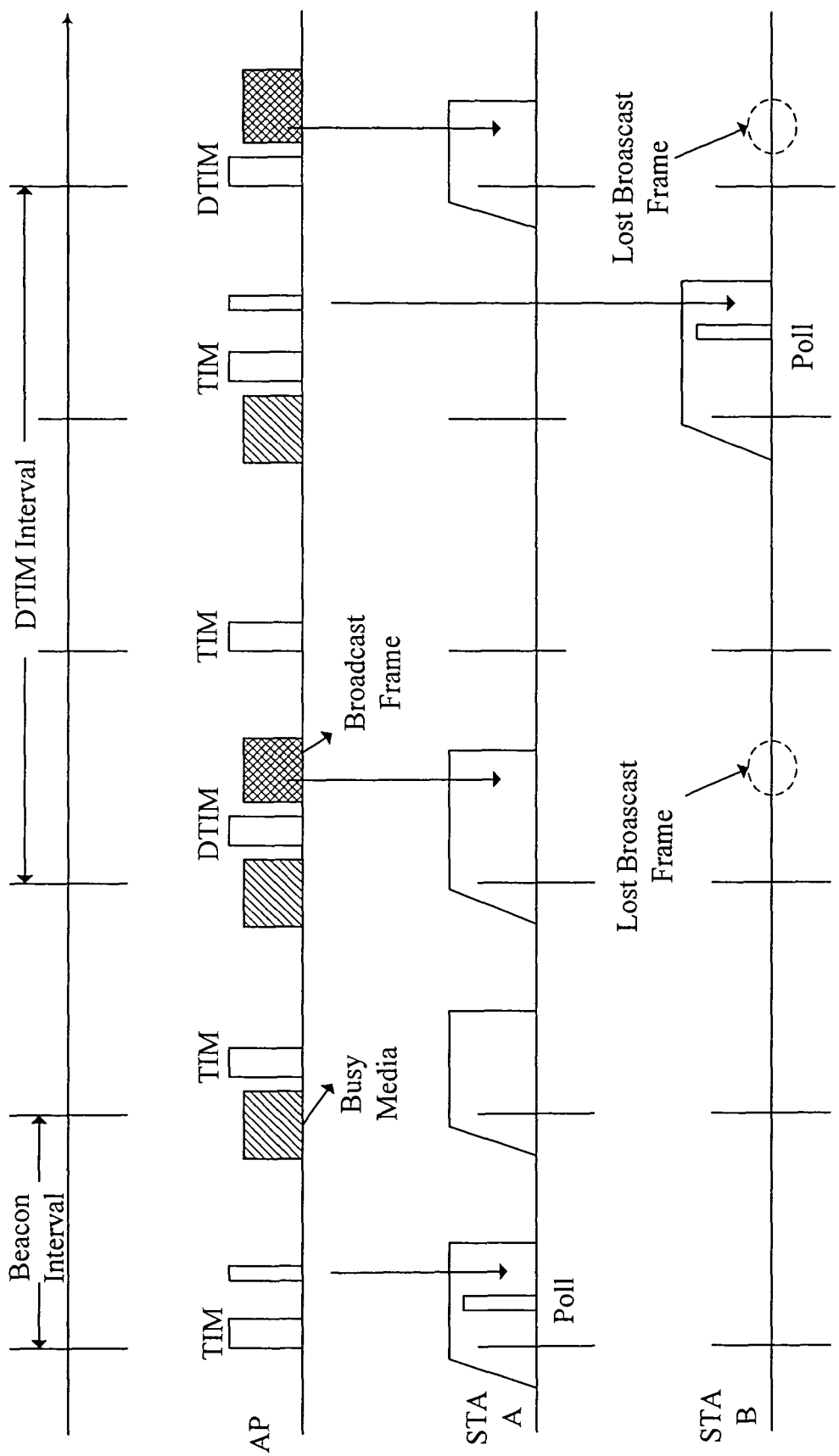
FIG. 1 shows an infrastructure power management operation without point coordination function (PCF)
Figure 2:
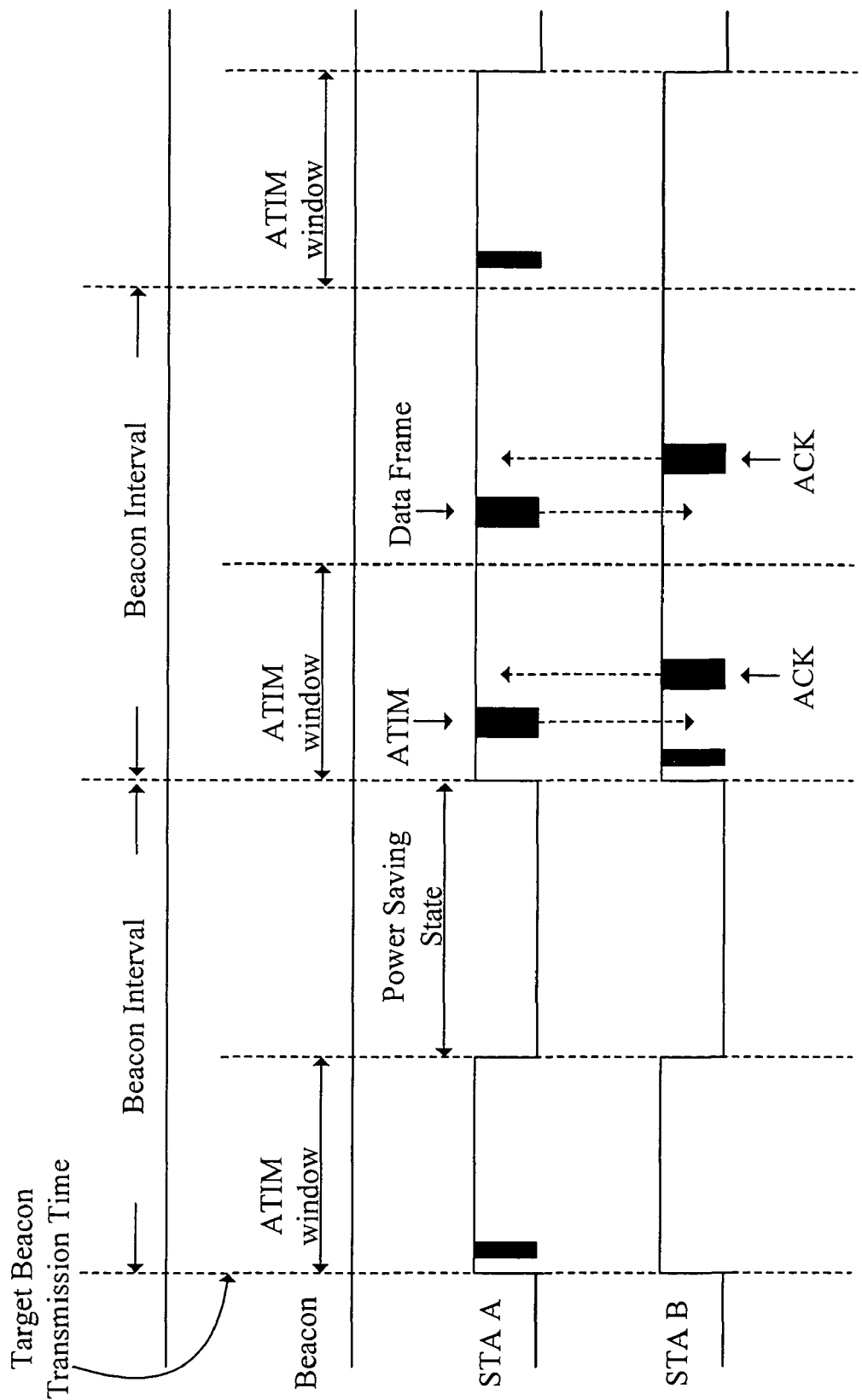
FIG. 2 shows a basic power-saving operation in an independent basic service set (IBBS) of an ad hoc WLAN.
Figure 3:
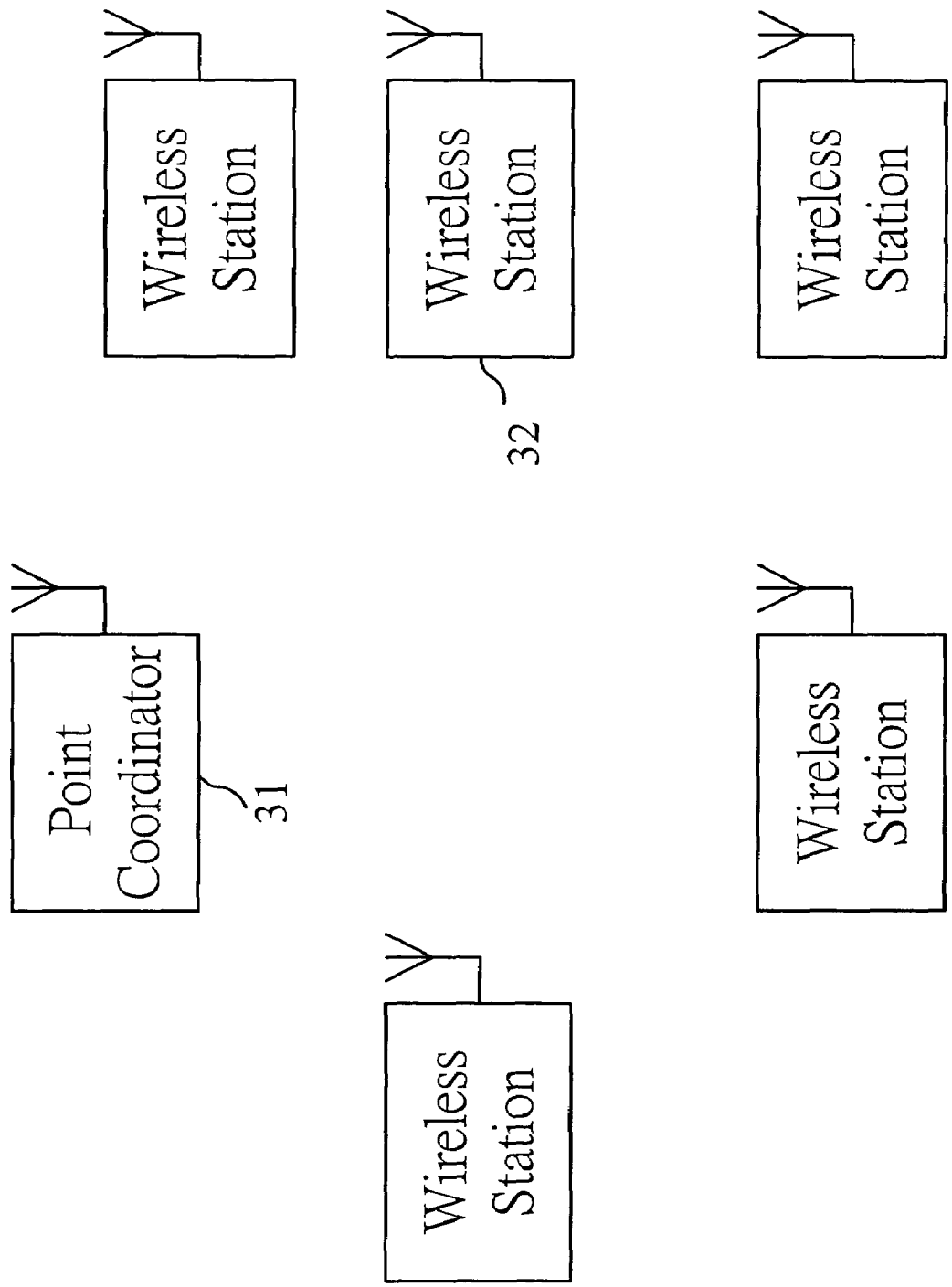
FIG. 3 shows an embodied configuration of the present invention for an infrastructure wireless network.

With reference to FIG. 3, there is shown an embodied configuration of present invention for an infrastructure wireless local area network including a point coordinator 31 and plural stations 32. Each station has an active state and a power-saving state. The power-saving state incurs lower power consumption than the active state. The point coordinator 31 may or may not be connected to another wireless network and normally be within an access point (AP). The station 32 has a wireless transceiver to transmit and receive data through a radio medium directly to and from the point coordinator 31. The wireless network can be employed with 802.11 protocol as described in IEEE 802.11 standard for transmits/receives data.

Figure 4:
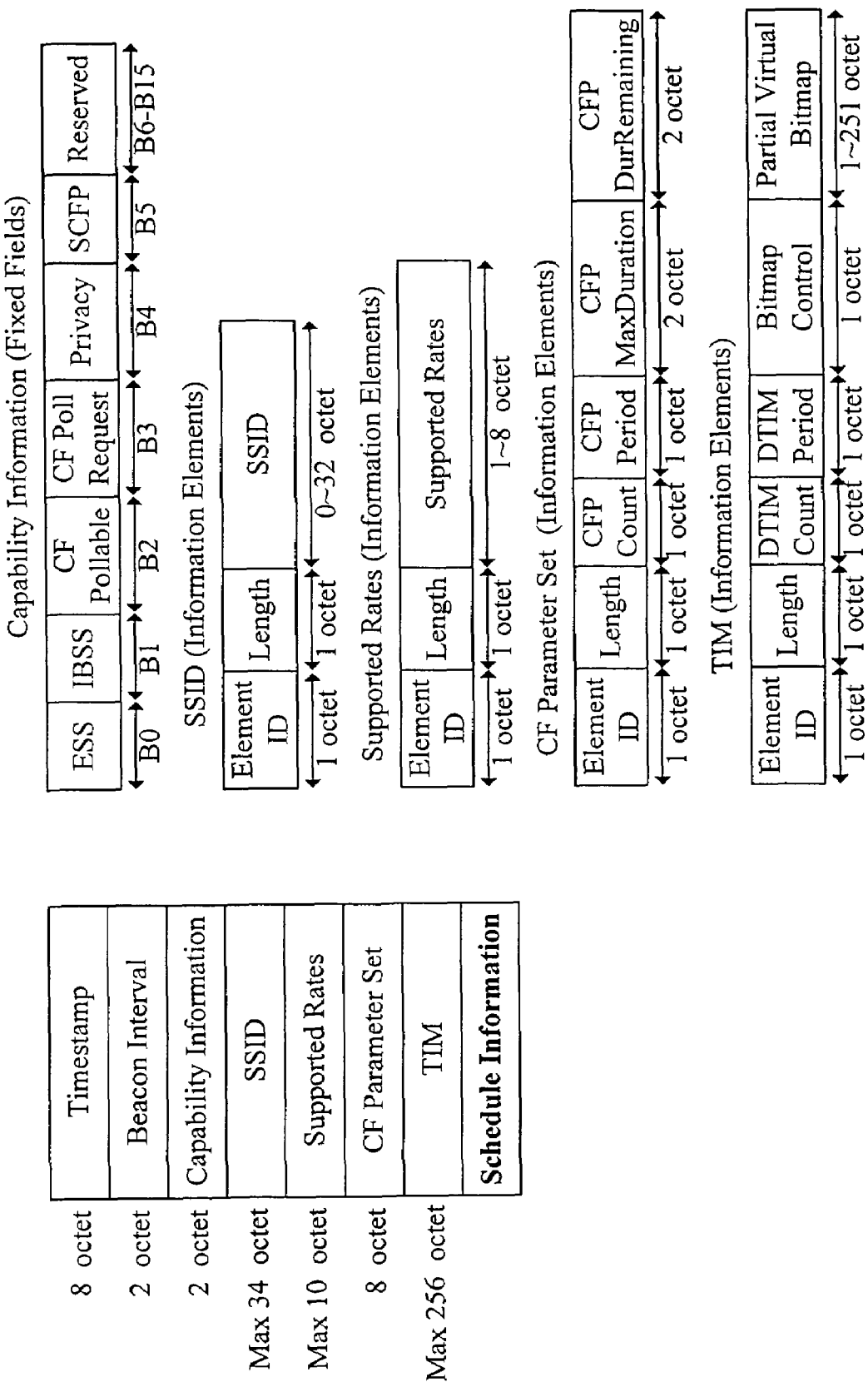
FIG. 4 shows a new beacon frame body and its sub-fields in accordance with the present invention.

In the above wireless local area network, the point coordinator 31 periodically transmits a new beacon frame. FIG. 4 illustrates the beacon frame body and its sub-fields in accordance with present invention. The Capability Information field of a beacon frame is used to indicate requested or advertised capabilities and 5-th to 15-th bits are reserved. In the present invention, one of the reserved bits is defined as the SCFP (Scheduled Contention Free Period) sub-field, and the SCFP sub-field is used to indicate whether the point coordinator 31 supports the power-saving mechanism or not. The point coordinator 31 may set bacon's SCFP sub-field to 1 if the proposed power-saving mechanism is supported, otherwise the point coordinator sets beacon's SCFP sub-field to 0. The plural stations that support the proposed power-saving mechanism are named as SCFP-STAs (Scheduled Contention Free Period—Station), which are aware of the Schedule Information field from the received beacon. The Schedule Information field indicates the medium access time of each SCFP-STA during the contention free period (CFP). Thus, the SCFP-STA can only wake up at the specific medium access time to send or receive the packet after receiving the beacon frame and enter the sleep mode (power-saving state) to save the power during the other remaining CFP.

Figure 5:
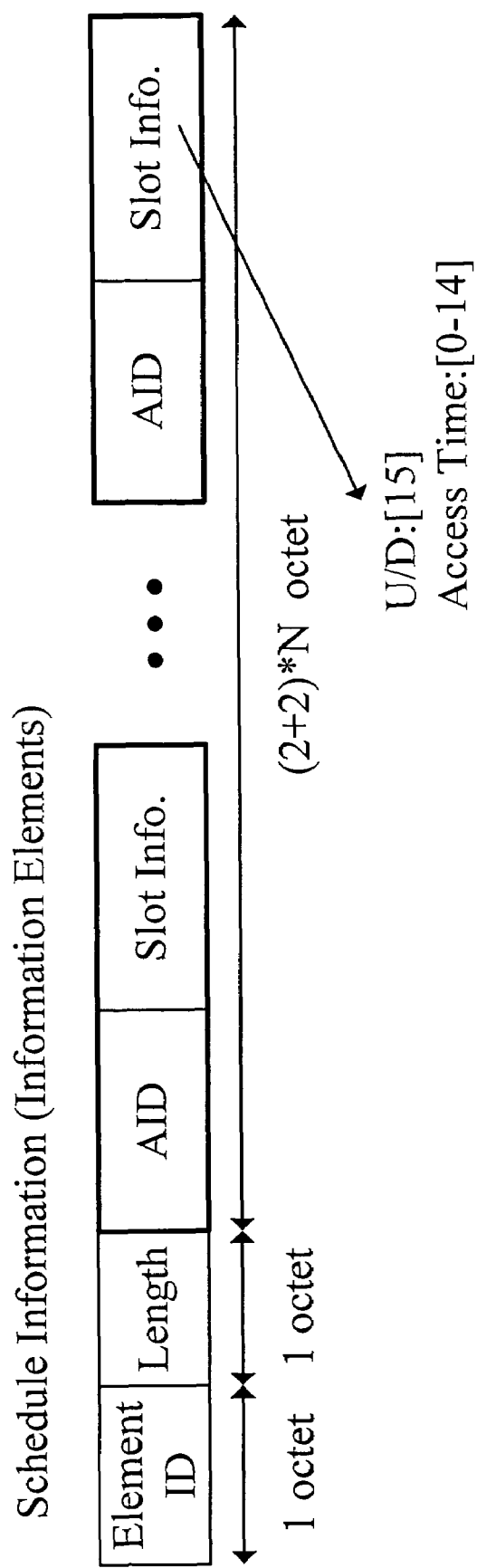
FIG. 5 shows the sub-fields of schedule information field in accordance with the present invention.

FIG. 5 illustrates the sub-fields of Schedule Information field to inform the SCFP-STAs of the start time accessing the radio medium. The Schedule Information field is an Information Element within the beacon frame such that its first and second sub-fields are Elements ID (identification) sub-field and Length sub-field, respectively. The Elements ID sub-field of the Schedule Information indicates that this Information Element is a Schedule Information field, and the Length sub-field indicates the size of the Schedule Information field. Several pairs of AID (Association Identification) sub-field and SI (Slot Information) sub-field follow the Length sub-field, and each pair can indicate the medium access time of a certain SCFP-STA. The AID sub-field is 2 octets in length. Each AID is mapping to a certain associated SCFP-STA since a STA gets an AID after successfully associating with the point coordinator 31. The length of a Slot Information sub-field is also 2 octets and the length can be extended according to the different requirements.

Figure 6:
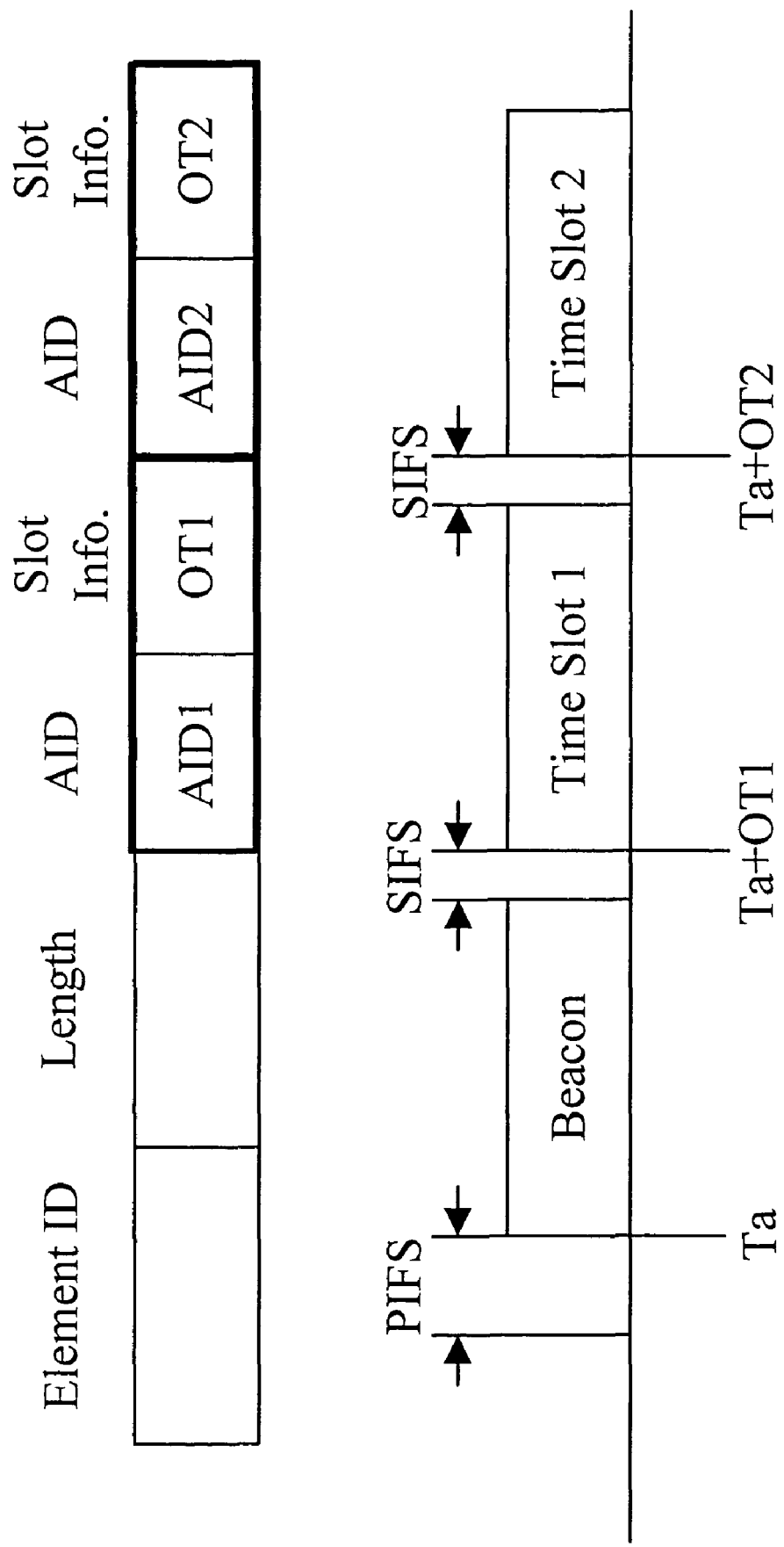
FIG. 6 shows a relationship of the access time and the slot information sub-fields in accordance with the present invention.

The 0-th to 14-th bits of the Slot Information sub-field form the Access Time sub-field that records the time offset between the time stamp and the start time to access the radio medium. In the FIG. 6, it shows the relationship of the access time and the Slot Information sub-fields. As shown, the value of the Time Stamp field is Ta, the access time of the first Slot Information sub-field is OT1, and the access time of the second Slot Information sub-field is OT2. The SCFP-STA with AID1 starts at the time Ta+OT1 to access the radio medium to send or receive the packet, and the second SCFP-STA with AID2 starts at the time Ta+OT2.

The 15-th bit of the Slot Information sub-field forms the U/D sub-field that indicates the operation of receiving data (download) or data transmission (upload) at a specified SCFP-STA's medium access time. The U/D sub-field is set to 1 if the point coordinator 31 downloads the data to the SCFP-STA at the medium access time. If 0 is set, the SCFP-STA can upload the data to the point coordinator 31 at the medium access time.

The length of the Schedule Information field can be extended to meet different requirements, for example, additional sub-field could be appended to the Schedule Information field to explicitly indicate the data rate for different medium access time. The Access Time sub-field can also record the time stamp to access the radio medium.

With such a frame format, the beacon frame transmitted by the point coordinator 31 is provided with schedule information which includes plural sets of association identification and time slot information. The association identification indicates that there is duration for a corresponding station 32 to receive/transmit data and the time slot information specifies the time that the corresponding station 32 is in the active state for receiving/transmitting data.

In the above wireless local area network, each station 32 periodically enters its active state to receive the beacon frame and then each station 32 enters its power-saving state after receiving the beacon frame. If there is duration for a specific station 32 to receive/transmit data, the specific station 32 enters its active state to receive/transmit data in the time specified by the time slot information in the beacon frame and each station 32 re-enters its power-saving state after the data transmission or stays in its power-saving state if there is no corresponding association identification in the schedule information.

Figure 7:
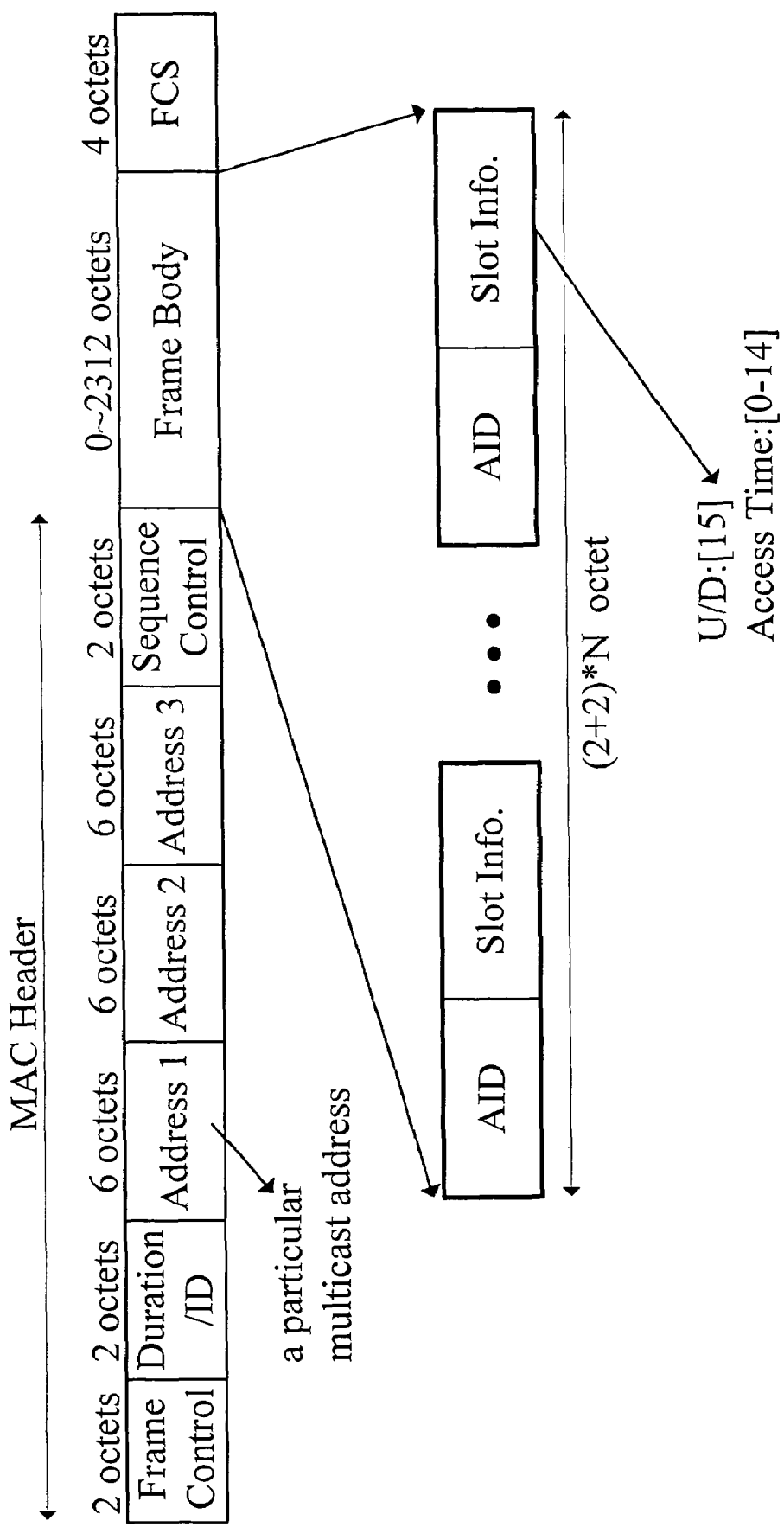
FIG. 7 shows a schedule information data frame and its sub-fields in accordance with the present invention.

On the other hand, the CFP can also be programmed by broadcasting a schedule information (SI) frame, which can be a general WLAN's data frame, a WLAN's management frame, or a new WLAN's control frame. FIG. 7 shows a SI data frame and its sub-fields. As shown, in the SI data frame, Frame Control, Duration/ID, Sequence Control, and FCS sub-fields are the standard fields and their lengths are 2, 2, 2, and 4 octets respectively. The Address 1 sub-field contains a specified multicast address to indicate that this data frame is a SI data frame. The Frame Body sub-field contains several pairs of AID (Association Identification) sub-field and SI (Slot Information) sub-field as described aforementioned.

Figure 8:
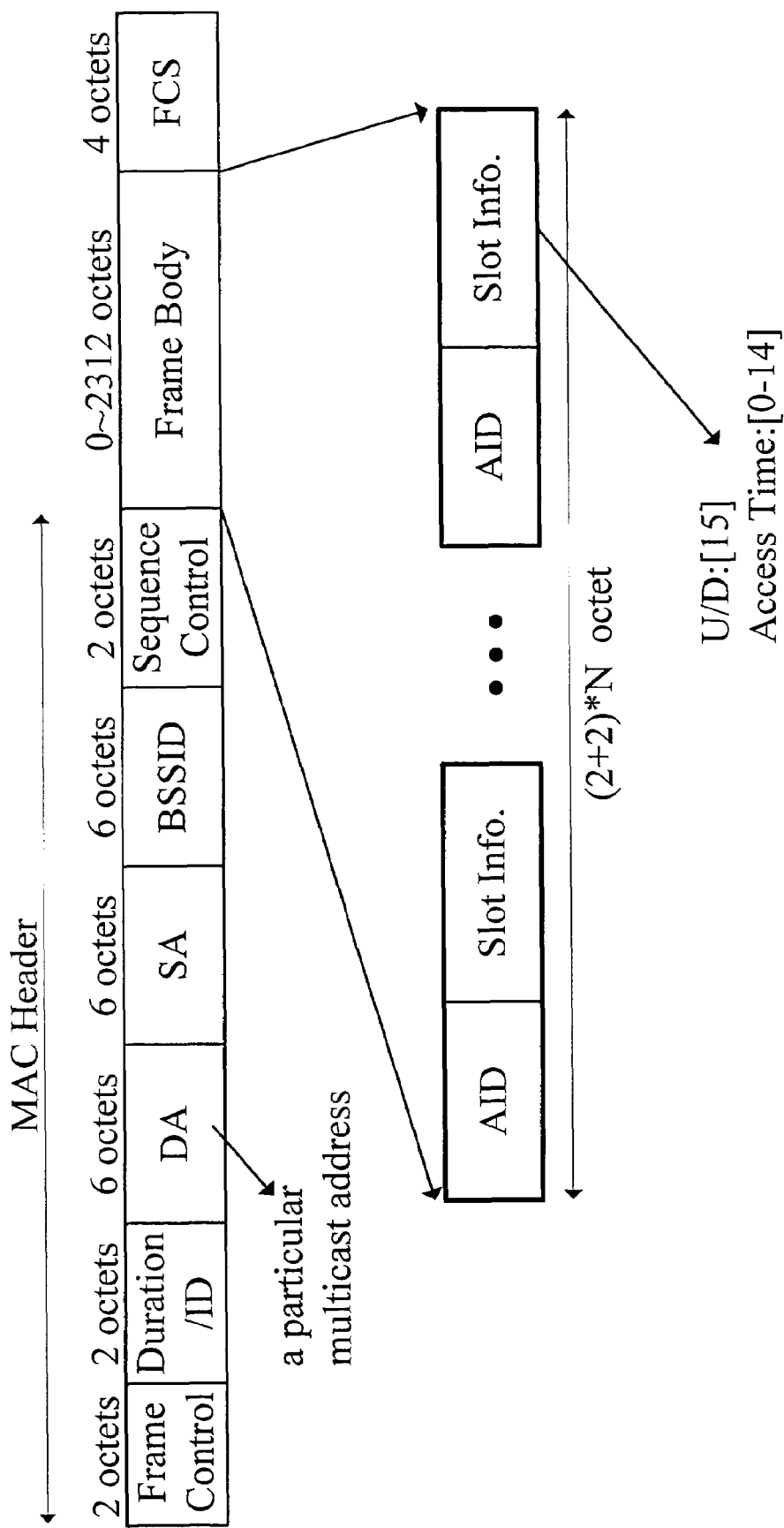
FIG. 8 shows a schedule information management frame and its sub-fields in accordance with the present invention.

FIG. 8 shows a SI management frame and its sub-fields. As shown, in the SI management frame, Frame Control, Duration/ID, Sequence Control, and FCS sub-fields are the standard fields and their lengths are 2, 2, 2, and 4 octets respectively. The destination address (DA) sub-field contains a specified multicast address to indicate this management frame is a SI management frame. The Frame Body sub-field contains several pairs of AID (Association Identification) sub-field and SI (Slot Information) sub-field as described aforementioned.

Figure 9:
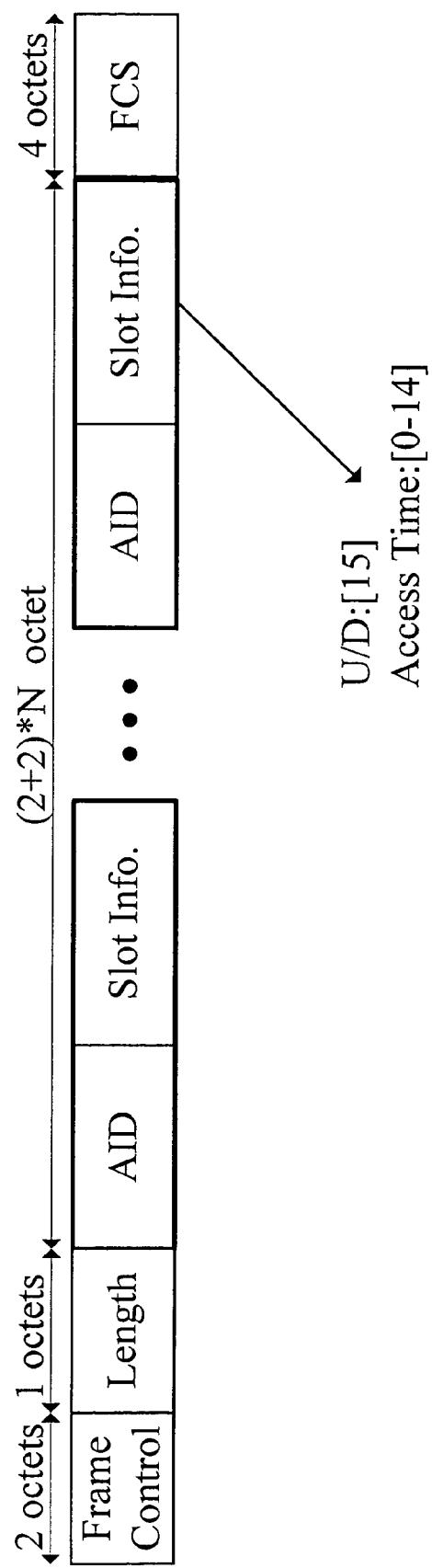
FIG. 9 shows a schedule information control frame and its sub-fields in accordance with the present invention.

FIG. 9 shows a SI control frame and its sub-fields. As shown, in the SI control frame, it contains several pairs of AID (Association Identification) sub-field and SI (Slot Information) sub-field as described aforementioned. A subtype field in the Frame Control field indicates that the frame is a SI control frame.

In the above wireless local area network, the point coordinator 31 periodically transmits a beacon frame. Then, the point coordinator 31 further transmits a schedule information (SI) frame after transmitting the beacon frame. The schedule information (SI) frame includes plural sets of association identification and time slot information as described aforementioned.

Afterwards, each station 32 periodically enters its active state to receive the beacon frame and the schedule information (SI) frame, and each station 32 enters its power-saving state after receiving the beacon frame and the schedule information frame.

If there is duration for a specific station 32 to receive/transmit data, the specific station 32 enters its active state to receive/transmit data in the time frame specified by the time slot information in the schedule information frame and each station 32 re-enters its power-saving state after the data transmission or stays in its power-saving state if there is no corresponding association identification in the schedule information.

By using the various well-known scheduling algorithms such as FIFO, RR, WFQ, and WRR to set the pair of AID sub-field and Slot Information sub-field, the medium access time for the associated SCFP-STAs can be dynamically scheduled to not only reduce the power consumption but also meet the different QoS (Quality of Service) requirements for the different connections.

Figure 10:
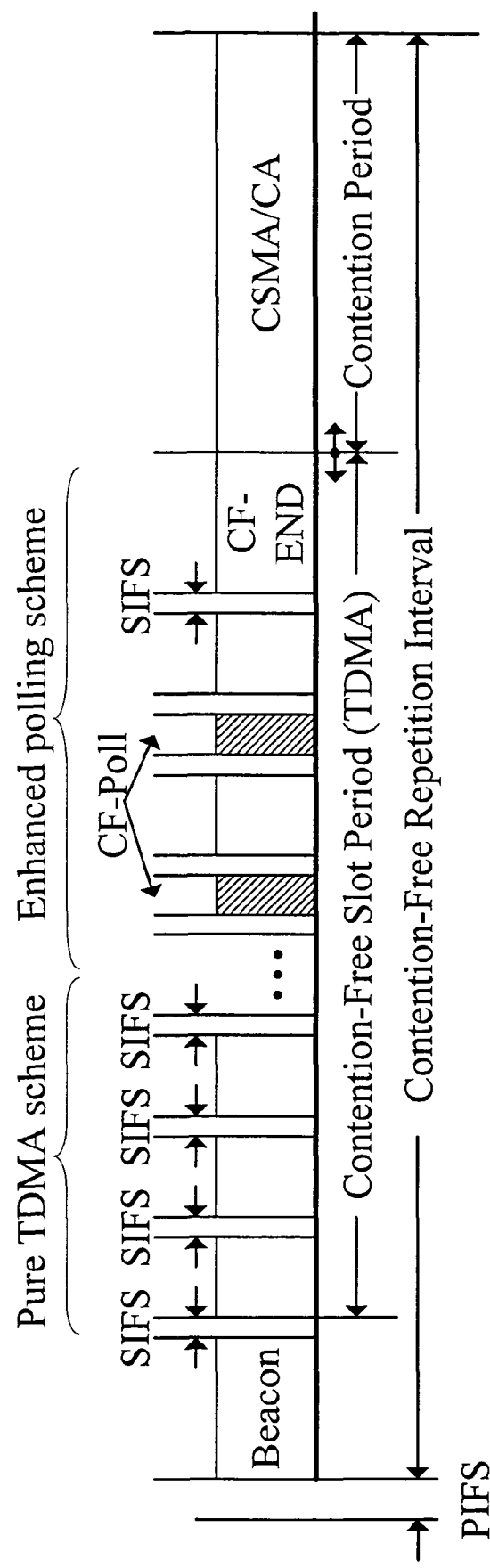
FIG. 10 shows an application for TDMA access scheme in accordance with the present invention.
Figure 11:
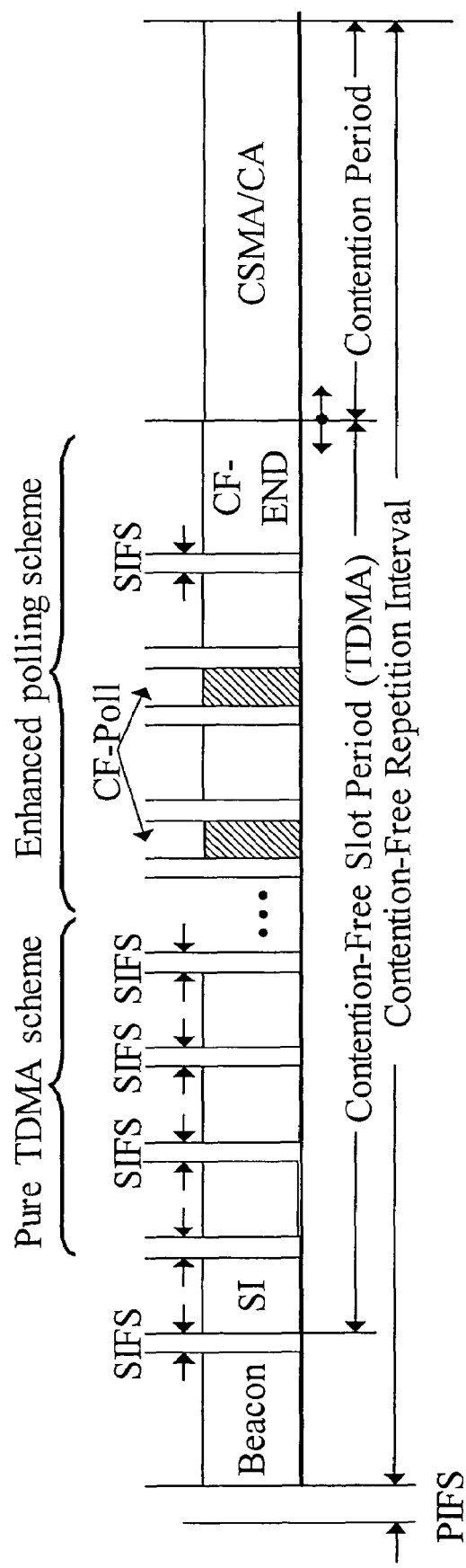
FIG. 11 shows an application for TDMA access scheme programmed by SI frame in accordance with the present invention.

FIG. 10 and FIG. 11 show an application for TDMA access scheme in accordance with the present invention. FIG. 10 shows the proposed TDMA access method used in the PCF mode that is programmed by the beacon frame's SI sub-field, and FIG. 11 shows the proposed TDMA access method used in the PCF mode that is programmed by SI frame. The PCF period is divided into a lot of access time slots, and those medium access time slots can be easily programmed with fixed or variable size according to the Slot Information sub-field. During the TDMA period, the SCFP-STAs should only access the medium at the time that the point coordinator 31 assigns to it. On the other hand, during the TDMA period, the traditional STAs can only access the medium to upload their packet after receiving the point coordinator's polling frame. If the point coordinator 31 doesn't poll the traditional STAs, those traditional STAs would not interfere in the channel. Thus, it can run compatibly with the traditional polling scheme during the CFP since the proposed TDMA access scheme and the traditional polling scheme both are controlled by the point coordinator 31.

FIG. 10 and FIG. 11 also illustrate that the point coordinator 31 can still provide an enhanced polling scheme or the traditional polling scheme after the TDMA access scheme to poll the STAs for data transmissions. The enhanced polling scheme combines the proposed TDMA scheme with the traditional polling scheme. By using the enhanced polling scheme, the SCFP-STAs only wake up at the medium access time to transmit the packet after the polling frame (with download packet if any) while the traditional STAs stay in the active mode during the PCF time period to wait for the polling message.

In the programming of the medium access time slots, the medium access time slots could be only programmed for the transmissions of data packets if the transmitting packets are time-critical and tolerant to some losing data. On the other hand, each medium access time slot could be programmed to include the time for data transmission and the ACK frame if the transmitting packets are error-sensitive.

Figure 12:
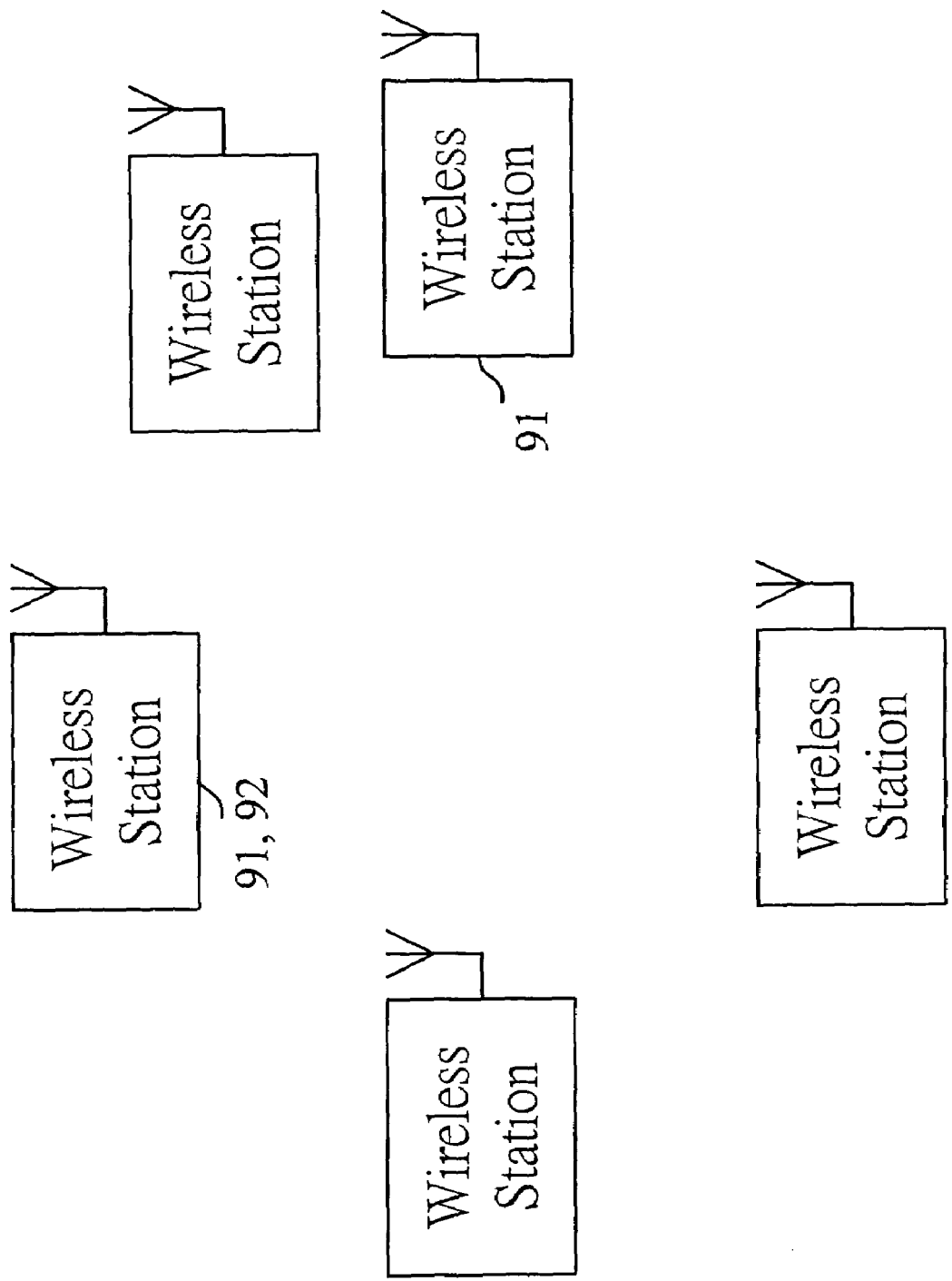
FIG. 12 shows another embodied configuration for an ad hoc wireless network in accordance with the present invention.

With reference to FIG. 12, there is shown another embodiment of the present invention for an ad hoc wireless network including a plurality of stations 91. One of the stations is designated as a control station 92. The remaining stations 91 have an active state and a power-saving state, and are able to transmit and receive data through a radio medium directly to and from each other. The control station 92 may or may not be connected to another wireless network. Each station 91 has a wireless transceiver to transmit and receive data through the radio media directly to and from each other. The ad hoc wireless network can be employed with 802.11 protocol as described in IEEE 802.11 standard for transmits/receives data.

The distributed coordination function (DCF) access method can be applied in the infrastructure WLAN and the ad hoc WLAN. The stations 32 should synchronize their timing according to hearing the point coordinator's beacon frame in the infrastructure WLAN. In the ad hoc WLAN, stations 91 (STAs) periodically contend to send the beacon at the start of each beacon interval. If one of the stations successfully transmits a beacon frame, the other stations may synchronize their timing to the received beacon. Because the beacon frames are not broadcasted by a certain identical station 91 in the ad hoc WLAN, the aforementioned embodiment used in the PCF mode cannot be both used in the infrastructure WLAN and the ad hoc WLAN in the DCF mode. Therefore, the mechanism used in the DCF mode utilizes the Duration field to reserve enough time to dynamically re-program the medium access behavior of each STA during the contention period (CP). The stations 91 that should access the radio medium can only wake up at the specific access time to send or receive the packet, and thus power-saving can be effectively achieved.

Due to the use of the IEEE 802.11's NAV (Net Allocation Vector) attributes, the technology used in the DCF mode runs compatible with the CSMA/CA protocol during the CP.

In this embodiment, a control station (CTRL-STA) should be selected in the network to manage and assign the medium access time for other stations 91. In the infrastructure WLAN, the point coordinator 31 could be selected as the CTRL-STA, however, there should be some distributed algorithms in the ad hoc WLAN to select a station to be CTRL-STA according to the stations' remaining energy, computing power, location, and so on.

In the above ad hoc wireless local area network, the remaining stations 91 associate with the control station 92 to obtain their association identifications. The stations that support the power-saving mechanism of the present embodiment are named as SCP-STAs (Scheduled Contention Period— station). The SCP-STAs associate with the CTRL-STA by sending an association control frame, and then get an association identification (AID) from the CTRL-STA.

Then, the CTRL-STA transmits a schedule information frame after a beacon frame followed by a predetermined time period PIFS (Point Coordination Function Inter-Frame Space). The CTRL-STA is similar to the point coordinator 31 as aforementioned and transmits the beacon frame. After a PIFS free medium period, the CTRL-STA transmits the SI (Schedule Information) frame. The SCP-STAs in the network could read information within the SI frame to obtain their medium access time.

The schedule information frame includes a duration field set to a specific time duration, and a frame body having a plurality of sets of association identification and time slot information. The association identification indicates that there is a corresponding remaining station 91 to access the radio media. The time slot information specifies the time that the corresponding remaining station 91 is in active state for accessing the radio media.

Figure 13:
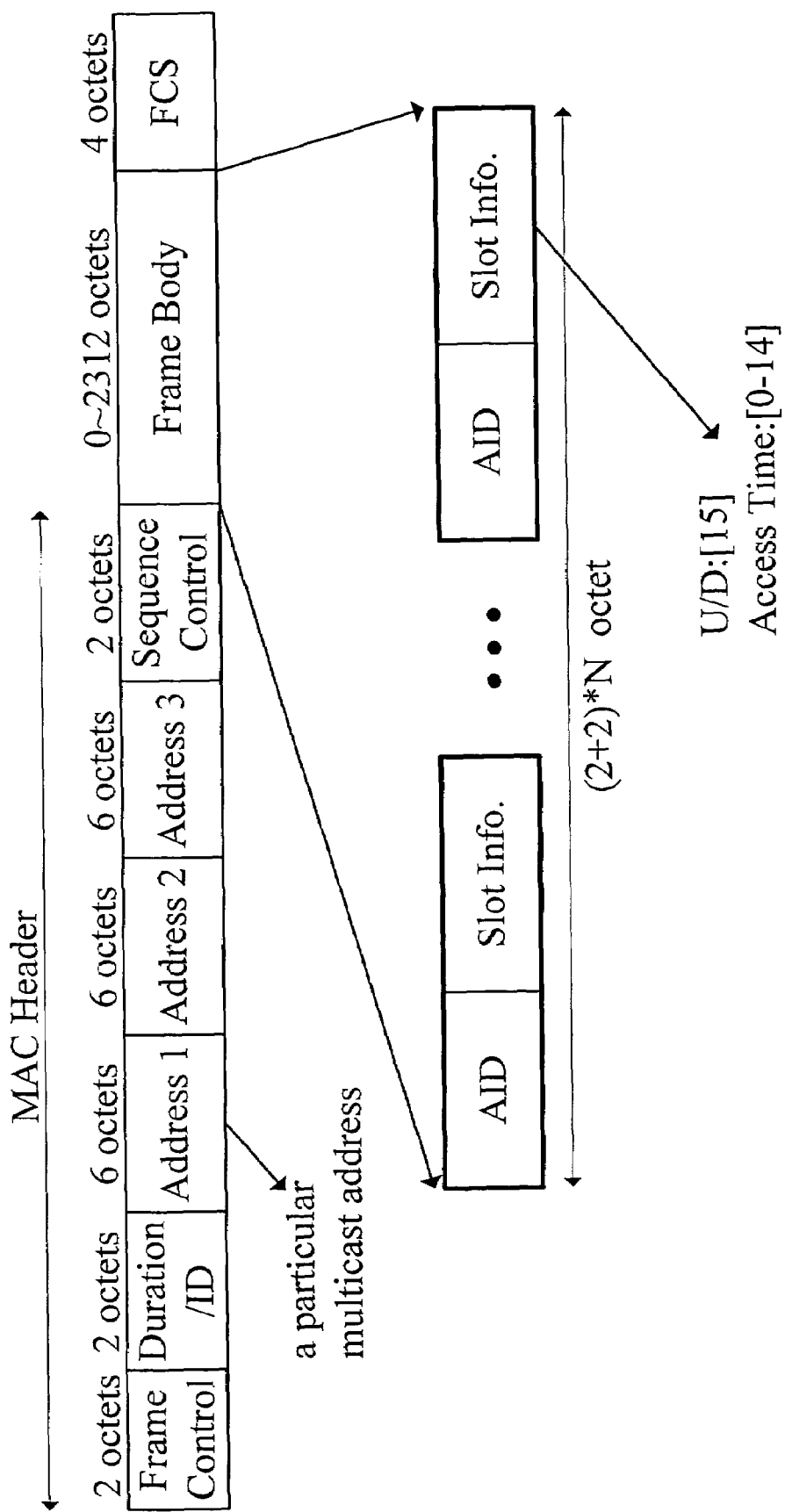
FIG. 13 shows a format of schedule information data/management frame in accordance with the present invention.

The format of SI data/management frame is illustrated in FIG. 13, wherein the SI frame is a regular data/management frame and its Duration field within the MAC header is set to a large value to reserve enough time to dynamically re-program the medium access behavior of each STA in the SI frame's NAV duration.

The Address 1 field in the MAC header is set to a particular multicast address as illustrated in FIG. 13. All SCP-STAs would receive and interpret a certain frame as a SI frame if the Address 1 field of that frame is the particular multicast address. The frame body field records the medium access time of each SCP-STAs in several pairs of AID (Association Identification) sub-field and SI (Slot Information) sub-field. Each pair can indicate the medium access time of a certain SCP-STA. The length of an AID sub-field is 2 octets. Each AID is mapping to a certain associated SCP-STA since a STA gets an AID after successfully associating with the CTRL-STA. The length of a SI sub-field is also 2 octets and the length can be extended according to the different requirements. The 0-th to 14-th bits of the SI sub-field form the Access Time sub-field that records the time offset between the time stamp and the start time for accessing the radio medium. The 15-th bit of the SI sub-field forms the U/D sub-field that indicates the operation of receiving or transmitting data at this SCP-STA's medium access time. The U/D sub-field is set to 1 if the other SCP-STA sends the data to the SCP-STA at the medium access time and is set to 0 if the SCP-STA transmitting the data to the other SCP-STA at the medium access time.

The length of the SI field can be extended to meet the different requirements, for example, the additional sub-field could be appended to the Schedule Information field to explicitly indicate the different medium access duration for different medium access time. The Access Time sub-field can also record the time stamp to access the radio medium.

Next, each remaining station 91 periodically enters its active state to receive the beacon frame and the schedule information frame, and then each remaining station 91 enters its power-saving state after receiving the beacon frame and the schedule information frame. After reading the information within the SI frame, the SCP-STAs can determine the start time to access the radio medium.

Afterwards, if there is an association identification indicates that there is a corresponding remaining station 91 to access the radio media, the remaining station 91 enters its active state to access the radio media in the time specified by the time slot information in the schedule information frame, each remaining station 91 re-enters its power-saving state after the data transmission or stays in its power-saving state if there is no corresponding association identification in the schedule information frame.

Some various well-known scheduling algorithms such as FIFO, RR, WFQ, and WRR can schedule the medium access time for different pairs of sender SCP-STA and receiver SCP-STA, and the medium access time for the associated SCP-STAs can be dynamically arranged by setting the pair of AID sub-field and SI sub-field to not only reduce the power consumption but also meet the different QoS (Quality of Service) requirements for the different connections.

Because the Duration field of SI frame is set to a large value, the large remaining NAV duration that deducts the transmission time of SI frame from the NAV duration can be used for programming the TDMA access scheme. The traditional STAs don't interfere in the proposed TDMA scheme since they don't transfer their packets during other one's NAV duration. In other words, the proposed mechanism used in the DCF mode runs compatible with the CSMA/CA protocol during the CP.

Figure 14:
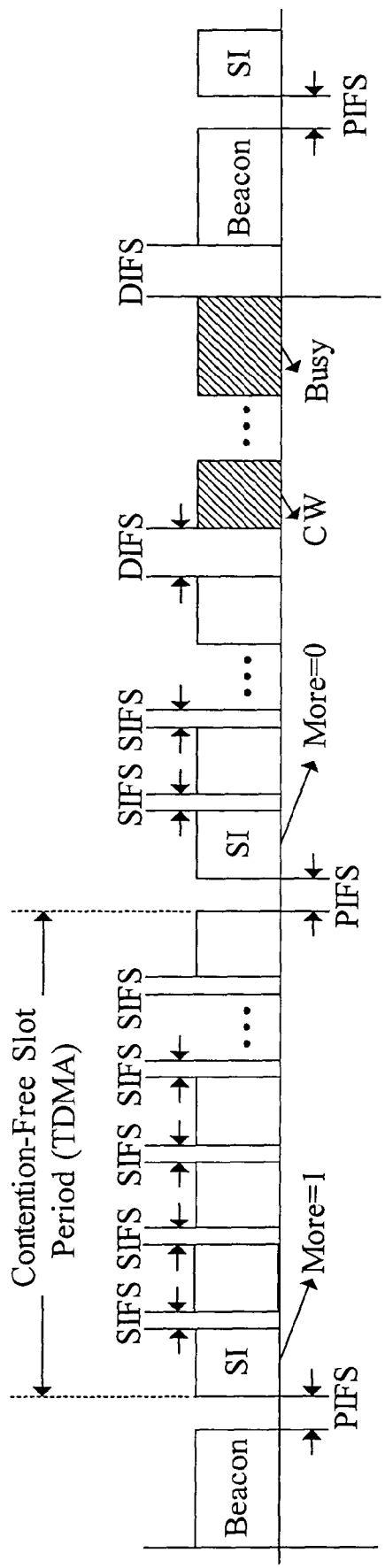
FIG. 14 shows a TDMA access scheme programmed by using the present invention in the DCF mode.

FIG. 14 shows the TDMA access scheme that is programmed by using the present invention in the DCF mode. A beacon frame is followed by a SI frame, that is, the CTRL-STA transmits the SI frame after only waiting a PIFS idle medium period. Numbers of medium access time slots follow the SI frame, and those medium access time slots can be easily programmed as the time slots with fixed or variable size by using the Slot Information sub-field. However, the NAV duration required by a MAC frame has an upper bound, that is, the maximum value in the Duration field is 32767 µs. If the first round of NAV duration is insufficient for the needs of all active connections, the CTRL-STA would set the first SI frame's More Data sub-field to 1, where the More Data sub-field (not shown in the FIG. 14) is in the Frame Control field. After waiting a PIFS idle medium period, CTRL-STA sends the next SI frame to reserve more NAV duration for the TDMA access scheme. On the contrary, the CTRL-STA would set the current SI frame's More Data field to 0 if the current NAV duration is large enough for the needs of all active connections. According to the More Data field, the SCP-STAs can be aware of whether the CTRL-STA "multicasts" more SI frame or not. If the CTRL-STA stops transmitting the SI frame, the medium access mode returns to the normal CSMA/CA access method and the traditional STAs contend for the radio medium for data transmission during the remaining CP.

In the programming of the medium access time slots, the medium access time slots could be only programmed for the transmissions of data packets if the transmitting packets are time-critical and tolerant to some losing data. On the other hand, each medium access time slot could be programmed to include the time for data transmission and the ACK frame if the transmitting packets are error-sensitive.

In view of the foregoing, it is known that the present invention utilizes the schedule information in a beacon field or broadcasting a schedule information frame to re-program the medium access behavior of each STA during the contention-free period (CFP). The stations that should access the radio medium can only wake up at the specific access time to send or receive the packet, and thus the objective of power-saving can be effectively achieved. Due to the use of the IEEE 802.11's NAV (Net Allocation Vector) attributes, the present invention used in the DCF mode runs compatible with the CSMA/CA protocol during the CP.

Although the present invention has been explained in relation to its preferred embodiment, it is to be understood that many other possible modifications and variations can be made without departing from the spirit and scope of the invention as hereinafter claimed.

What is claimed is:

1. A method for power-saving in a wireless local area network including a point coordinator and plural stations, each having an active state and a power-saving state, and transmitting and receiving data through a radio medium directly to and from the point coordinator, the method comprising:
    a beacon transmitting step in which the point coordinator periodically transmits a beacon frame embedding a schedule information field such that the beacon frame is compatible with the 802.11 standard without transmitting a schedule information frame following the beacon frame, the schedule information field including plural sets of an association identification sub-field and a time slot information sub-field, the association identification sub-field indicating that there is duration for a corresponding station to receive/transmit data and the time slot information sub-field specifying the time that the corresponding station is in the active state for receiving/transmitting data;
    a beacon receiving step in which each station periodically enters its active state to receive the beacon frame; and
    a wake-up step in which a specific station enters its active state to receive/transmit data in the time specified by the time slot information in the beacon frame when there is duration for the specific station to receive/transmit the data.

2. The method as claimed in claim 1, wherein in the beacon receiving step, each station enters its power-saving state after receiving the beacon frame.

3. The method as claimed in claim 1, wherein in the wake-up step, each station stays in its power-saving state if there is no corresponding association identification in the schedule information.

4. The method as claimed in claim 1, wherein further comprises:
    a re-entering sleep mode step in which each specific station re-enters its power-saving state after the data transmission.

5. The method as claimed in claim 1, wherein in the beacon transmitting step, the time slot information is a time stamp.

6. The method as claimed in claim 1, wherein in the beacon transmitting step, the time slot information is a time offset.

7. The method as claimed in claim 1, wherein in the beacon transmitting step, the schedule information is scheduled according to a schedule algorithm for meeting QoS requirements.

8. A system for power-saving in a wireless local area network, comprising:
    plural stations, each having an active state and a power-saving state, transmitting and receiving data through the radio media directly to and from a point coordinator, and periodically entering its active state to receive a beacon frame; and
    the point coordinator which periodically transmits the beacon frame embedding a schedule information field such that the beacon frame is compatible with the 802.11 standard without transmitting a schedule information frame following the beacon frame, the schedule information field including plural sets of an association identification sub- field and a time slot information sub-field, the association identification sub-field indicating that there is duration for a corresponding station to receive/transmit data, the time slot information sub-field specifying the time that the corresponding station is in the active state for receiving/transmitting data;
    wherein a specific station enters its active state to receive/transmit data in the time specified by the time slot information in the beacon frame when there is duration for the specific station to receive/transmit the data.

9. The system as claimed in claim 8, wherein each station enters its power-saving state after receiving the beacon frame.

10. The system as claimed in claim 8, wherein each station stays in its power-saving state if there is no corresponding association identification in the schedule information.

11. The system as claimed in claim 8, wherein each specific station re-enters its power-saving state after the data transmission.

12. The system as claimed in claim 8, wherein the time slot information is a time stamp.

13. The system as claimed in claim 8, wherein the time slot information is a time offset.

14. The system as claimed in claim 8, wherein the schedule information is scheduled according to a schedule algorithm for meeting QoS requirements.

* * * * *